United States Patent [19]

Jankowiak et al.

[11] 4,447,084
[45] May 8, 1984

[54] EXPLOSIVELY SEPARABLE LINK

[75] Inventors: Roman Jankowiak, St. Petersburg; Maurice W. Connell, Naples, both of Fla.

[73] Assignee: Conax Corporation, Buffalo, N.Y.

[21] Appl. No.: 291,245

[22] Filed: Aug. 10, 1981

[51] Int. Cl.³ .................. A44B 19/00; B64D 17/38
[52] U.S. Cl. .................................. 294/83 AE; 24/603
[58] Field of Search ............. 294/83 AE, 83 A, 83 R; 24/230 A, 230 AL, 230 AN; 89/1.5 R, 1.5 F; 244/137 R, 151 R, 151 A

[56] References Cited

U.S. PATENT DOCUMENTS 3,624,813 11/1971 Gaylord .................. 294/83 AE
3,744,102 7/1973 Gaylord .................. 24/230 A
4,023,846 5/1977 Poehlmann ............. 294/83 AE Primary Examiner—James B. Marbert
Attorney, Agent, or Firm—Christel, Bean & Linihan

[57] ABSTRACT

The present invention is an explosively separable link provided in a strap assembly for automatic disengagement of two connected link members upon the occurrence of a predetermined event. The link assembly includes a first link member substantially in the form of a yoke having a pair of oppositely disposed coaxial apertures, one in each arm of the yoke. A second link member is provided and comprises a housing positioned between the arms of the yoke and includes a pair of opposed outwardly extending pins, each of which is cooperably received in one of the apertures in the yoke arm to permit relative rotation between the link members about the axis of the apertures. The housing in the second link includes a cylindrical bore coaxial with the axis of the apertures. Slidably positioned in the cylindrical bore are a pair of oppositely disposed piston members which are in substantially gas-tight relationship with the cylinder wall. The outer faces of the piston members are operably connected to the pins which are received in the apertures in the yoke arms. Means are provided to admit pressurized gas to the outer face of each of the piston members to force them inwardly and thereby withdraw the pins from their associated apertures.

17 Claims, 3 Drawing Figures

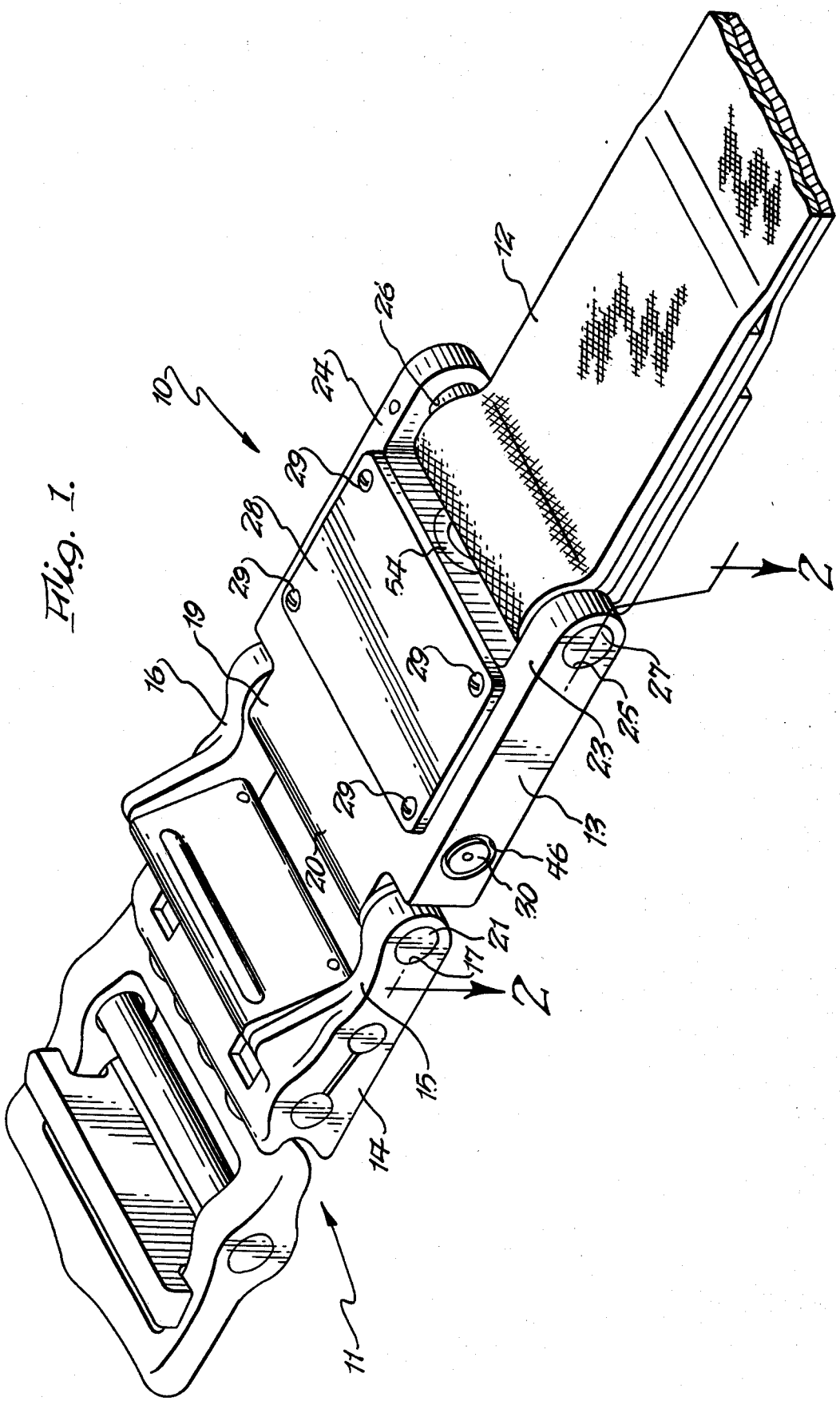

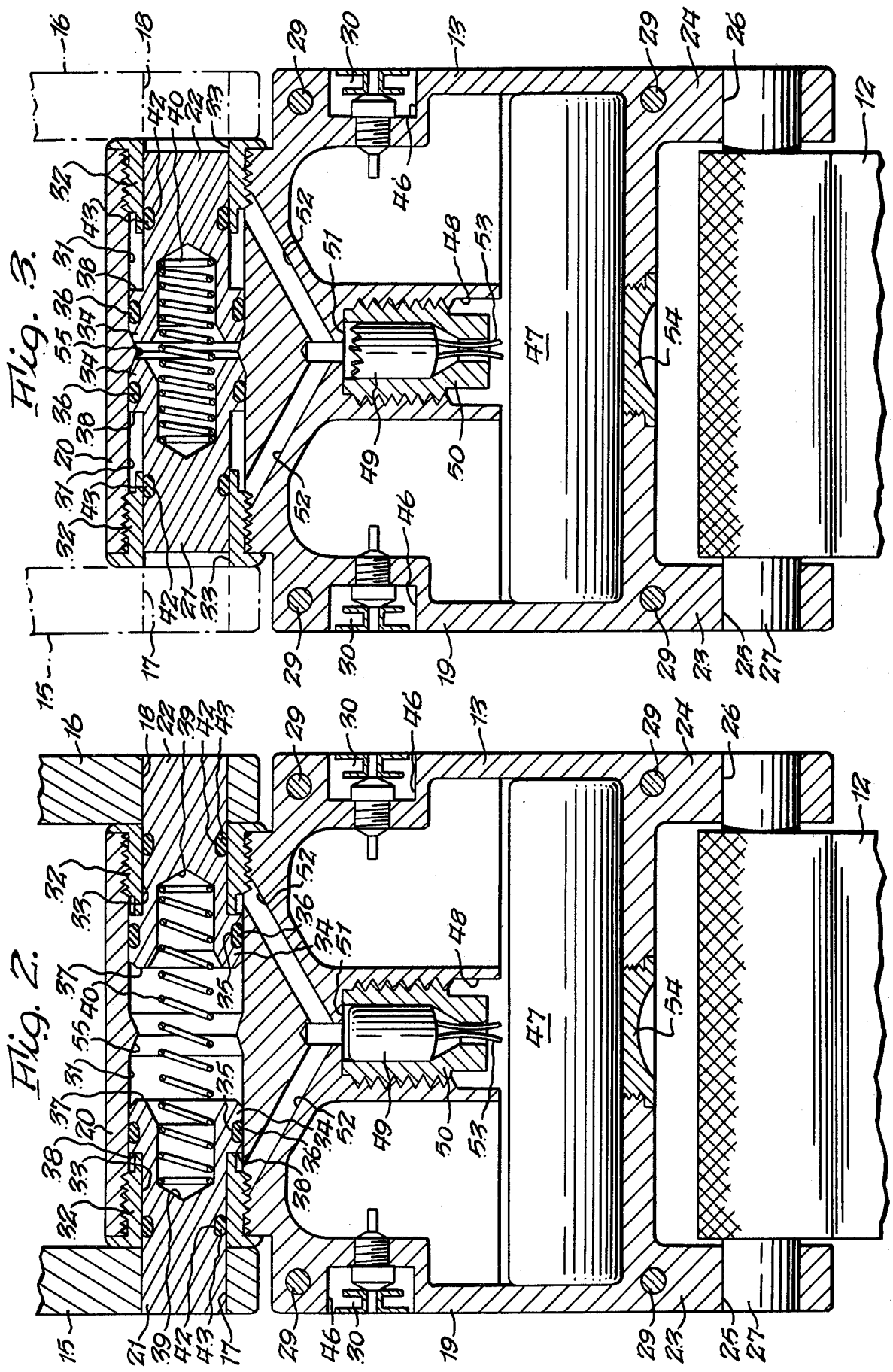

EXPLOSIVELY SEPARABLE LINK

BACKGROUND OF THE INVENTION

This invention relates to link assemblies which are automatically separable upon the occurrence of a predetermined event, and more particularly to a separable link in a strap arrangement wherein the link is adapted to be separable by means of a self-contained explosive charge.

In many applications where connecting belts or safety belts are employed, it frequently is desirable to provide for automatic separation of the belt upon the happening of a predetermined condition, assuming the wearer of the belt is for some reason, such as injury or incapacity, unable to effect separation thereof.

For example, when pilots or other aircraft crew members parachute from a plane over a body of water, it is essential that the straps which connect the parachute to the strap harness worn by the individual be readily separable. Various types of manually operated release mechanisms have been devised, but each requires that the wearer be conscious and be able manually to effect the desired release. If the individual is unconscious or is otherwise injured to the extent that he cannot manually effect release, automatic release means can be provided to insure release of the parachute when the wearer has entered the water. For example, in U.S. Pat. No. 3,744,102 there is disclosed a strap release mechanism which operates automatically to release the strap connection. A pressurized gas is provided to the link element to actuate a piston which moves in such a fashion as to cause link connecting pins to move inwardly to thereby permit the separation.

In U.S. Pat. No. 4,023,846 there is disclosed a link release mechanism wherein a movable bolt which provides the connection between adjacent link members is caused to move to a position wherein the two connecting links become separable. The movement of the bolt is accomplished by pressurized gas which is provided by an explosive cartridge which, in turn, is activated by a suitable sensor to sense when immersion in water takes place.

A number of the prior art devices are relatively bulky and require external sources of pressurized gas. Those in which a source of gas is provided in the form of an explosive cartridge frequently include a number of movable parts and also involve the use of shear pins to properly position the parts in their operating mode prior to actuation of the release means.

It is an object of the present invention to overcome the above-described difficulties and shortcomings and to provide an improved separable link which is self-contained, which includes a minimum of moving or movable parts, and which is relatively easy to manufacture and to install.

SUMMARY OF THE INVENTION

Briefly stated, in accordance with one aspect of the present invention an explosively separable link is provided in a strap assembly for automatic disengagement of two connected link members upon the occurrence of a predetermined event. The link includes means for connecting the respective portions to straps, or the like, so that they form an integral part of the strap arrangement and function as a load-bearing element of the strap when loads are applied thereto. The link assembly includes a first link member substantially in the form of a yoke having a pair of oppositely disposed coaxial apertures, one in each arm of the yoke. A second link member is provided and comprises a housing positioned between the arms of the yoke and includes a pair of opposed, outwardly extending pins, each of which is cooperably received in one of the apertures in the yoke arm to permit relative rotation between the link members about the axes of the apertures. The housing in the second link member includes a cylindrical bore coaxial with the axes of the apertures. Slidably positioned in the cylindrical bore are a pair of oppositely disposed piston members which are in substantially gas-tight relationship with the cylinder wall. The outer faces of the piston members are operably connected to the pins which are received in the apertures in the yoke arms. Means are provided to admit pressurized gas to the outer faces of each of the piston members to force them inwardly and thereby withdraw the pins from their associated apertures, thereby permitting separation of the link members from each other.

BRIEF DESCRIPTION OF THE DRAWINGS

FIG. 1 is a fragmentary perspective view of a parachute harness buckle which includes a separable link arrangement according to the present invention.

FIG. 2 is a fragmentary cross-sectional view of the separable link assembly taken along the line 2—2 of FIG. 1 and showing the arrangement of the various parts thereof in their normal relationship when the link members are connected.

FIG. 3 is a fragmentary cross-sectional view similar to that of FIG. 2 showing the parts thereof in their relative positions after actuation of the release means so that the two portions of the link assembly are readily separable.

DESCRIPTION OF THE PREFERRED EMBODIMENTS

Referring now to the drawings, and particularly to FIG. 1 thereof, there is shown a portion of a parachute strap structure 10, including a conventional, manually operable buckle 11. Also shown is a portion of a webbed strap 12 of the type which can be employed in that particular application. Positioned between manually operable buckle 11 and strap 12 is a connecting link 13 according to the present invention, and which is capable of automatic separation from manual buckle 11 upon the occurrence of a predetermined event, such as, for example, immersion of connecting link 13 in water. Manual buckle 11 includes a buckle member 14, one end of which is in the form of a yoke member including a pair of spaced arms 15, 16, and each of which includes an aperture 17, 18, respectively, (only one of which is visible in FIG. 1), the apertures being circular in configuration with their respective axes colinear and substantially perpendicular to the longitudinal axis of the strap structure.

Connecting link 13 includes a central housing portion 19 from which extends a projecting arm 20 which fits between yoke arms 15, 16, and which carries a pair of opposed, outwardly extending pins 21, 22 (only one of which is visible in FIG. 1), which are adapted to be slidably received in apertures 17, 18, respectively. Extending from central housing 19 in a direction opposite to that of projecting arm 20 are a pair of spaced parallel arms 23, 24, which include apertures 25, 26, respectively, to rotatably carry a transverse rod 27 about which webbed strap 12 is looped to provide a connection therebetween. Central housing portion 19 of connecting link 13 can include a cover plate 28, which can be secured thereto by screws 29 to permit access to the interior of housing portion 19. If additional tensile strength is required of connecting link 13, cover plate 28 can be omitted so that the top surface of the link is continuous for added strength, and other means of access can be provided.

Positioned along each outer edge of connecting link 13 is a sensing device 30, which is adapted to be responsive to the pressure of water and thereby to cause actuation of the device in order to effect release of connecting link 13 from manual buckle 11 upon immersion. An example of a suitable sensing device that can be employed in connection with a parachute canopy release mechanism is disclosed in copending application Ser. No. 207,340, filed Nov. 17, 1980, now U.S. Pat. No. 4,382,231 issued May 3, 1983 and entitled "Fluid Conductivity Sensor", which is assigned to the assignee of the present invention. That application is directed to an improved, water-activated electronic sensing circuit which is responsive to the rate of change of electrical conductivity of a fluid to which the electrodes associated with the circuit are exposed. However, it is not essential that the sensor and circuit disclosed in that application be utilized in connection with the present invention, and any other suitable sensor and circuit could be employed, depending upon the conditions under which automatic release of connecting link 13 from buckle member 14 is desired.

Referring now to FIG. 2, there is shown the interior of connecting link 13 according to the present invention and its interconnection with yoke arms 15, 16 of buckle member 14 of manual buckle 11. Each of yoke arms 15, 16, includes a substantially circular aperture 17, 18, respectively, the axes of each of which are coincident and extend generally perpendicularly to the longitudinal axis of the buckle-connecting link assembly. Projecting arm 20 of connecting link 13 extends into the space between yoke arms 15, 16, and carries connecting pins 21, 22, whereby buckle member 14 and connecting link 13 are interconnected by virtue of the interfitting of pins 21, 22, into apertures 17, 18, respectively. Projecting arm 20 includes a transverse, generally cylindrical bore 31, which is coaxial with pins 21, 22, and with apertures 17, 18, in yoke arms 15, 16, respectively. Threadedly connected to each outer end of bore 31 is a sleeve member 32, which defines a cylindrical inner bore 33 having a smaller diameter than bore 31. As shown, the diameter of bore 33 is equal to the diameters of apertures 17, 18.

Slidably positioned within bore 31 is a pair of cylindrical pistons 34 which can include a circumferential recess 35 within which a sealing ring 36 can be positioned to minimize the passage of gas between piston 34 and the inner surface of bore 31. Each piston 34 has an inwardly facing surface 37 and an outwardly facing surface 38, the inwardly facing surfaces of each piston being opposed to each other and including a coaxial recess 39 to receive a compression spring 40, which serves to urge pistons 34 outwardly. Outwardly facing surfaces 38 of each of pistons 34 are in contact with the inner faces of the respective sleeves 32 when the pistons are at the outer-most limits of their paths of travel.

Extending outwardly from outwardly facing surface 38 of each piston is a coaxial cylindrical extension in the form of pins 21, 22, each of which is slidably received in inner bore 33 of sleeve 32, and which can include a circumferential recess 42 to receive a sealing ring 43. Pins 21, 22 project outwardly a sufficient distance to be slidably received in apertures 17, 18, of yoke arms 15, 16, respectively.

The outer faces of connecting link 13 include a recess 46 to receive sensors 30, which can be of any convenient size or shape. Positioned inwardly of sensors 30 is an electronic circuit (not shown) which controls the activation of the link separating means. A battery 47 can be provided to furnish power for the control circuit.

Positioned within the body of connecting link 13 is a chamber 48 wherein an explosive cartridge 49 is received. Cartridge 49 is housed in a container 50 which is threadedly received in chamber 48. Extending from the inner end 51 of chamber 48 is a pair of outwardly extending passageways 52 which interconnect chamber 48 with bore 31 at a point adjacent and outwardly of outwardly extending surfaces 38 of each of pistons 34. Container 50 is configured that it seals off the outer end of bore 48, except to permit wires 53 to extend therethrough for connection to the control circuit (not shown). A threaded plug 54 can be provided at the end of central housing portion 19 opposite projecting arm 20 to permit access to the interior of central housing portion 19, as, for example, to permit replacement of container 50.

Cylindrical bore 31 in projecting arm 20 also includes an inwardly extending abutment 55 which can be positioned substantially at the longitudinal centerline of housing portion 19. The abutment can include a pair of inwardly sloping surfaces which join at the longitudinal centerline to provide a generally V-shaped, inwardly extending ridge, or it can be of any other convenient shape to accomplish its purpose, which will hereinafter be described.

In operation, when connecting link 13 is in contact with water and sensors 30 sense a predetermined change of electrical conductivity, or any other condition under which it is desired that the device be activated, the electronic control circuit is activated to electrically trigger explosive cartridge 49, detonating it, and thereby generating high pressure gases within chamber 48. Since one end of chamber 48 is sealed off by container 50, the gases flow through passageways 52 and pass into the annular space within bore 31 behind the outwardly facing surfaces 38 of pistons 34. The high pressure of the gases causes each of pistons 34 to move inwardly within bore 31, toward the center thereof, and against the outward force provided by compression spring 40. The sealing elements 36, 43, provide a tight seal, which causes the pressure of the gases to act entirely on outer piston surfaces 38, which, when they move inwardly, carry pins 21, 22, completely out of apertures 17, 18, respectively, thereby freeing the same and permitting release of buckle member 14 from connecting link 13.

After the cartridge has been exposed and the pistons have been moved inwardly, the parts are in the position shown in FIG. 3, wherein pins 21, 22, have been released from yoke arms 15, 16, respectively, and pistons 34 are at the innermost points of their paths of travel. In the course of moving inwardly the pistons have partially compressed spring 40, which upon release of the gas pressure would cause pistons 34 to move outwardly once again. However, inwardly extending abutment 55 having the two sloping surfaces shown forms a tapered end to the path of travel of pistons 34, causing each piston to be securely wedged in position at the innermost point of its path of travel. Thus, once the operation of the device has caused the pistons to move inwardly they remain in their innermost position to permit the yoke arms to be released from the connecting link.

It can thus be seen that the present invention provides significant advantages in that it is entirely self-contained, including the electrical circuitry and other components, which are positioned within the strap profile, and do not include any external appendages which can snag other portions of the user's clothing or equipment, which can get bent, or break off, or which would otherwise impede the user from full freedom of motion. Additionally, the structure comprehended by the present invention does not require the use of shear pins and the fact that the pistons are integral with the connecting pins reduces the number of parts, thereby greatly simplifying the construction of the device.

While particular embodiments of the invention have been illustrated and described, it will be apparent to those skilled in the art that various changes and modifications can be made without departing from the spirit and scope of the present invention, and it is intended to cover in the appended claims all such changes and modifications that fall within the scope of the present invention.

What is claimed is:

1. In a link connection adapted from automatic disengagement of two connected link members upon the occurrence of a predetermined event, and including means for connecting said link to a strap to form a part of said strap so that said link is a load-bearing element of said strap when loads are applied thereto, a first link member comprising a yoke member having a pair of oppositely disposed, coaxial apertures, one in each arm of said yoke member, a second link member comprising a housing positioned between the arms of said yoke and including a pair of opposed, outwardly extending pins each of which is cooperably received in one of said apertures to permit relative rotation between said link members about the axis of said apertures, the improvement comprising:
   (a) said housing in said second link member including a cylindrical bore coaxial with the axis of said apertures;
   (b) a pair of oppositely disposed piston members slidably positioned within said cylindrical bore in substantially gastight relationship therewith;
   (c) pin means operably connected with said piston members for movement therewith, said pin means being coaxial with said piston members and projecting a sufficient distance to be cooperably received in said apertures; and
   (d) means to provide pressurized gas to said piston members to force each piston member inwardly within said bore and thereby withdraw said pin means from said apertures.

2. The link connection of claim 1 including means for urging said piston members outwardly normally to maintain said pin means in engagement with said apertures.

3. The link connection of claim 2 wherein said means for urging said piston members outwardly includes a compression spring positioned within said cylindrical bore and between said piston members.

4. The link connection of claim 3 wherein said piston members have an inwardly directed face and an outwardly directed face, each of said outwardly directed faces having a coaxial cylindrical extension, said extensions forming outwardly directed pin members slidably receivable in said apertures.

5. The link connection of claim 1 including means to restrain said piston members in their innermost positions.

6. The link connection of claim 5 wherein said cylindrical bore includes an inwardly extending peripheral ridge providing an abutment for said piston members.

7. The link connection of claim 6 wherein said ridge includes inwardly sloping sidewalls to permit said piston members to become wedged thereagainst after said piston members have been driven inwardly.

8. The link connection of claim 1 wherein said second link member includes an explosive cartridge positioned in a chamber within said second link member to provide the source of pressurized gas.

9. The link connection of claim 8 wherein said cartridge is electrically activated.

10. The link connection of claim 9 wherein the activation of said cartridge is achieved by at least one sensing element carried by said second link member and responsive to a predetermined condition.

11. The link connection of claim 10 wherein said sensing element is responsive to a change in electrical conductivity.

12. The link connection of claim 8 wherein each of said piston members has an outwardly directed face and a cylindrical extension therefrom to provide said pin means and said second link member includes means forming communication passageways between said cartridge chamber and said cylindrical bore at a point outwardly of the outwardly directed face of each of said piston members.

13. The link connection of claim 12 wherein said piston members are integral with said pin members.

14. The link connection of claim 12 wherein said cartridge is substantially centrally positioned in said second link member.

15. The link connection of claim 4 wherein the means to force the piston members inwardly includes means self-contained within said second link member for providing pressurized gas against the outwardly directed faces of said piston members.

16. The link connection of claim 15 wherein said pin member has a smaller diameter than said piston member to define an annular surface against which said gas pressure acts.

17. The link connection of claim 16 wherein said second link includes an inner sleeve within and coaxial with said cylindrical bore at each end thereof, said sleeves having a smaller diameter than said cylindrical bore to slidably receive said pin members.

* * * * *